(12) United States Patent
Salour et al.

(10) Patent No.: US 8,963,720 B2
(45) Date of Patent: Feb. 24, 2015

(54) RFID TAG CONTAINER

(75) Inventors: Al Salour, Fenton, MO (US); Douglas Duane Trimble, Saint Peters, MO (US); Joseph Michael Fletcher, Seattle, WA (US)

(73) Assignee: The Boeing Company, Chicago, IL (US)

( * ) Notice: Subject to any disclaimer, the term of this patent is extended or adjusted under 35 U.S.C. 154(b) by 161 days.

(21) Appl. No.: 13/078,061

(22) Filed: Apr. 1, 2011

(65) Prior Publication Data
US 2012/0132552 A1 May 31, 2012

Related U.S. Application Data

(60) Provisional application No. 61/333,492, filed on May 11, 2010.

(51) Int. Cl.
G08B 13/14 (2006.01)
G06K 19/077 (2006.01)
B64D 45/00 (2006.01)

(52) U.S. Cl.
CPC .......... *G06K 19/07749* (2013.01); *B64D 45/00* (2013.01)
USPC ...................... 340/572.8; 340/572.1; 220/500; 29/592; 29/428; 206/216

(58) Field of Classification Search
USPC ................. 340/572.1, 539.31, 539.13, 572.8; 220/592.21, 500; 206/599, 14, 216; 29/592, 428
See application file for complete search history.

(56) References Cited

U.S. PATENT DOCUMENTS

| | | | |
|---|---|---|---|
| 6,043,746 A | 3/2000 | Sorrells | |
| 6,153,720 A | 11/2000 | Olzak et al. | |
| 6,812,841 B2 | 11/2004 | Heinrich et al. | |
| 6,842,121 B1 | 1/2005 | Tuttle | |
| 7,030,760 B1 | 4/2006 | Brown | |
| 7,064,668 B2 | 6/2006 | Porad | |
| 7,545,274 B2 | 6/2009 | Coop | |
| 7,551,086 B2 | 6/2009 | Coop et al. | |
| 7,589,636 B2 | 9/2009 | Ayyagari et al. | |
| 7,605,688 B1 | 10/2009 | Seah | |
| 7,649,476 B2 | 1/2010 | Hutton | |
| 8,519,906 B2 * | 8/2013 | Richards et al. | 343/912 |
| 2003/0015334 A1 * | 1/2003 | Clement et al. | 174/50 |
| 2004/0140898 A1 | 7/2004 | Reeves | |
| 2004/0243065 A1 * | 12/2004 | McConnell et al. | 604/183 |
| 2004/0262306 A1 * | 12/2004 | Smith | 220/4.26 |
| 2005/0030741 A1 * | 2/2005 | Uke | 362/200 |
| 2006/0086808 A1 * | 4/2006 | Appalucci et al. | 235/492 |
| 2006/0163000 A1 * | 7/2006 | Chowthi | 182/72 |

(Continued)

FOREIGN PATENT DOCUMENTS

DE 8509404 8/1985
DE 202009013112 12/2010

OTHER PUBLICATIONS

Patent Cooperation Treaty; International Search Report and Written Opinion for PCT/US2012/025823 dated May 30, 2012.

*Primary Examiner* — Hoi Lau
(74) *Attorney, Agent, or Firm* — Parsons Behle & Latimer

(57) ABSTRACT

An RFID tag container includes a container body having a first container portion and a second container portion detachably engaging the first container portion, wherein the container body is sized and configured to contain an RFID tag in a flame-proof, fluid-tight and vapor-tight seal.

22 Claims, 3 Drawing Sheets

(56) References Cited

U.S. PATENT DOCUMENTS

| | | | |
|---|---|---|---|
| 2006/0187061 A1* | 8/2006 | Colby | 340/572.8 |
| 2006/0214791 A1* | 9/2006 | Tethrake et al. | 340/572.1 |
| 2006/0244604 A1* | 11/2006 | Sakama et al. | 340/572.7 |
| 2007/0008115 A1* | 1/2007 | Morhard et al. | 340/539.13 |
| 2007/0061598 A1 | 3/2007 | Bitton et al. | |
| 2007/0065718 A1* | 3/2007 | Moon | 429/185 |
| 2007/0132580 A1* | 6/2007 | Ambrefe, Jr. | 340/541 |
| 2007/0188325 A1* | 8/2007 | Morhard et al. | 340/572.1 |
| 2007/0188330 A1* | 8/2007 | Morhard et al. | 340/572.8 |
| 2007/0194019 A1 | 8/2007 | Seagle et al. | |
| 2007/0199839 A1* | 8/2007 | Sharon et al. | 206/219 |
| 2007/0236353 A1* | 10/2007 | Marsilio et al. | 340/572.1 |
| 2008/0030333 A1* | 2/2008 | Marsilio et al. | 340/572.1 |
| 2008/0030334 A1* | 2/2008 | Marsilio et al. | 340/572.1 |
| 2008/0055044 A1 | 3/2008 | Fronek et al. | |
| 2008/0105738 A1* | 5/2008 | Oldendorf et al. | 235/375 |
| 2008/0165485 A1* | 7/2008 | Zadesky et al. | 361/683 |
| 2008/0252730 A1* | 10/2008 | Hong | 348/155 |
| 2008/0291025 A1* | 11/2008 | Perez et al. | 340/572.1 |
| 2009/0020529 A1* | 1/2009 | Stottmeister | 220/212 |
| 2009/0040025 A1* | 2/2009 | Volpi et al. | 340/10.1 |
| 2009/0053678 A1* | 2/2009 | Falkenhayn et al. | 434/16 |
| 2009/0066518 A1* | 3/2009 | Tanaka et al. | 340/572.8 |
| 2009/0140867 A1* | 6/2009 | Yin et al. | 340/626 |
| 2009/0145839 A1* | 6/2009 | Miga, Jr. | 210/466 |
| 2009/0153334 A1* | 6/2009 | Burns et al. | 340/572.8 |
| 2009/0219679 A1 | 9/2009 | Moore et al. | |
| 2009/0243855 A1* | 10/2009 | Prokopuk | 340/572.1 |
| 2009/0266722 A1* | 10/2009 | Rogers et al. | 206/216 |
| 2010/0007501 A1* | 1/2010 | Yang et al. | 340/572.8 |
| 2010/0033323 A1* | 2/2010 | Tsai et al. | 340/539.31 |
| 2010/0039256 A1* | 2/2010 | Manahan | 340/540 |
| 2010/0090822 A1* | 4/2010 | Benson et al. | 340/508 |
| 2010/0097218 A1* | 4/2010 | Weng et al. | 340/572.1 |
| 2010/0134949 A1* | 6/2010 | Choi | 361/301.2 |
| 2010/0141447 A1* | 6/2010 | Neuwirth | 340/572.1 |
| 2010/0156606 A1* | 6/2010 | Gold | 340/10.4 |
| 2010/0214077 A1* | 8/2010 | Terry et al. | 340/10.4 |
| 2010/0258331 A1* | 10/2010 | Dahlgren et al. | 174/50.54 |
| 2010/0283578 A1* | 11/2010 | Henderson | 340/5.6 |
| 2010/0300904 A1* | 12/2010 | Sharon | 206/222 |
| 2011/0012775 A1* | 1/2011 | Richards et al. | 342/146 |
| 2011/0050423 A1* | 3/2011 | Cova et al. | 340/572.1 |
| 2011/0186585 A1* | 8/2011 | Lu | 220/575 |
| 2012/0298676 A1* | 11/2012 | Cooks | 220/592.21 |
| 2013/0015083 A1* | 1/2013 | Seagle et al. | 206/216 |
| 2013/0193005 A1* | 8/2013 | Hoeth | 206/14 |

* cited by examiner

RFID TAG CONTAINER

CROSS-REFERENCE TO RELATED APPLICATIONS

This application claims the benefit of U.S. provisional application No. 61/333,492, filed May 11, 2010, and entitled UNIVERSAL INTRINSICALLY SAFE CONTAINER FOR BATTERY OPERATED RFID TAGS, which application is hereby incorporated by reference in its entirety.

BACKGROUND

Active RFID systems are widely used to identify and track components in aircraft and other structures. Active RFID systems include RFID location tags equipped with a lithium battery that may last about 3 to 5 years. Although the battery is enclosed inside the tag hardware, the RFID tag cannot be placed in certain areas surrounding and inside the aircraft in confined space. Use of RFID tags is specially restricted in aircraft final assembly operations and is limited during the aircraft ramp and flight tests.

Since the final location of an RFID tag in an aircraft may be unpredictable, it is desirable not to limit the use of RFID tags to only certain areas of the aircraft. Such limitations would require resources to control where the active RFID tags travel and are placed and, thus, may impede the affordability that can be gained using RFID technology.

Accordingly, a universal, cost-effective device is needed to safely contain any type of active, battery-operated RFID tag in a variety of environments.

SUMMARY

The disclosure is generally directed to an RFID tag container adapted to contain an RFID tag. An illustrative embodiment of the RFID tag container includes a flame-proof, fluid-tight and vapor-tight sealed container.

In some embodiments, the RFID tag container may include a flame-proof, fluid-tight and vapor-tight sealed container comprising a first container portion and a second container portion detachably engaging said first container portion.

The disclosure is further generally directed to a device containment method. An illustrative embodiment of the device containment method includes providing a container, inserting an RFID tag in the container, closing and sealing the container with a flame-proof, fluid-tight and vapor-tight seal and attaching the container to an asset.

BRIEF DESCRIPTION OF THE ILLUSTRATIONS

DETAILED DESCRIPTION

Figure 1:
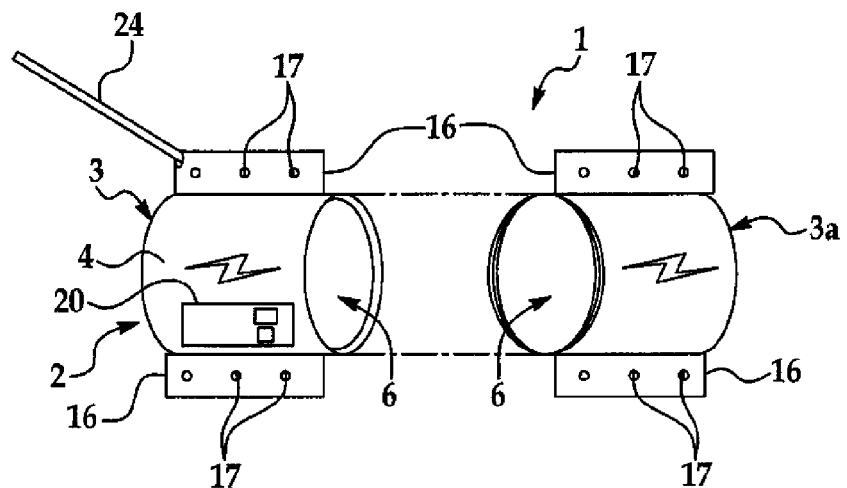
FIG. 1 is a top exploded view of an embodiment of the RFID tag container, with a pair of container portions detached from each other.

The following detailed description is merely exemplary in nature and is not intended to limit the described embodiments or the applications and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims.

The disclosure is generally directed to a Radio Frequency Identification (RFID) tag container which is suitable to safely house a battery-powered RFID tag in any type of environment. The RFID tag container may be suitable for use in Class 1 (combustible gas and liquids) and/or Class 2 (combustible dust) under Division 1 (electrical equipment exposed in explosion atmosphere) and/or Division 2 (electrical equipment in an explosive atmosphere), i.e., C1 D1, C2 D1, C1 D2, C2 D2, conditions. The RFID tag container may house an active RFID tag which is fabricated by any manufacturer for safe operation of the RFID tag in any location in an aircraft or other structure. In addition, the RFID tag container may enable use of, active RFID tags at any location in an aircraft assembly factory or aircraft ramp/flight field.

Referring initially to FIGS. 1-4, an embodiment of the RFID tag container is generally indicated by reference numeral 1. The RFID tag container 1 may be reusable and may include a body 2 comprising a first portion 3 and a second portion 3a. The container body 2 may also include a generally elongated, cylindrically shape side wall 4 and two ends walls 5 defining an interior 6 of the container 1. In some embodiments, the container side wall 4 and the container end walls 5 may be a hard plastic or other RF-friendly material. In some embodiments, the container side wall 4 and each container end wall 5 may have a thickness of about 0.20" and the container body 2 may have a diameter of about 3½" and a length of about 4". In alternate embodiments, the container body 2 thickness may be greater than 0.02" or less than 0.02". In further embodiments, the diameter of the container may be greater than or less than 3½" and the container length may be greater than or less than 4".

Figure 2:
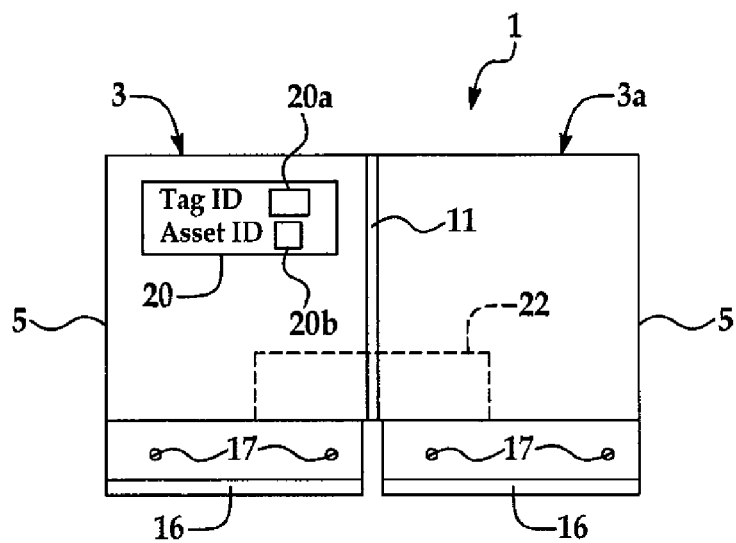
FIG. 2 is a side view of an embodiment of the RFID tag container with the container portions in an assembled configuration.

Referring to FIGS. 1 and 2, the interior 6 of the container body 2 may be configured to securely receive and contain an RFID tag 22. The RFID tag container 1 may be configured to be compatible with a variety of technology standards and transmissions including, but not limited to, IEEE 802.11b/g (Wi-Fi), IEEE 802.15.4, and Ultra wide band 6 to 8 GHz radio transmissions.

Figure 3:
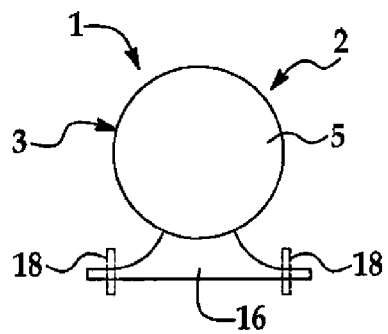
FIG. 3 is an end view of an embodiment of the RFID tag container.

Referring to FIGS. 1 and 3, in some embodiments, the container 1 may include at least one container mount flange 16 that may extend from the first and/or second portions 3, 3a of the container body 2. The mount flange 16 may include one or more openings 17 that enable the container body 2 to be selectively attached to an asset or other component (not illustrated) for tracking purposes using the RFID tag 22 inside the container body 2. In one embodiment, one or more fasteners 18 may be inserted through one or more openings 17 to secure the container body 2 to the asset. In an alternate embodiment, at least one tie 24 can be used, either alone or in combination with one or more fasteners 18, to secure the container body 2 to the asset or component. In yet another embodiment, pressure-sensitive tape (not shown) may be used, either alone or in combination with one or more fasteners 18 and/or ties 24, to attach the container mount flange 16 of the container body 2 to the asset or component. In still other embodiments, other attachment devices and means for securing the container mount flange 16 to the asset or component may include, but are not limited to, bolts, tie wraps, hook and loop fastener tape, rivets, adhesives (permanent and removable), screws, and welds.

Figure 4:
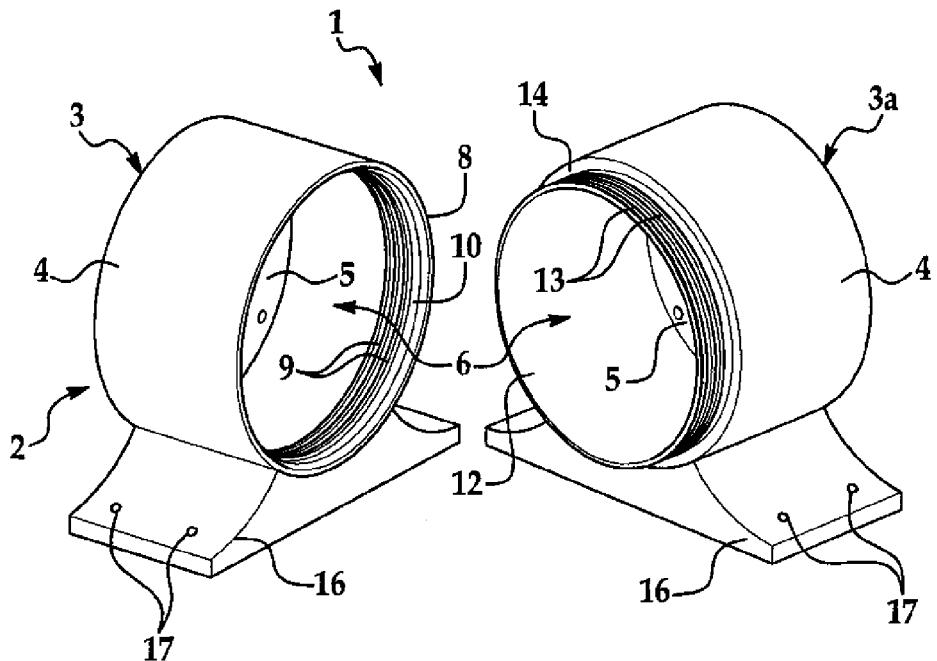
FIG. 4 is a perspective view of an illustrative embodiment of the RFID tag container.

The container interior 6 may be selectively opened and closed for placement therein and/or removal there from of the RFID tag 22. As shown in FIGS. 1, 2 and 4, in some embodiments, the container body 2 may be fabricated as a pair of complementary or mating first and second container body portions 3 and 3a, respectively, with optional tamper proof and/or visual indicators to ensure proper coupling and/or secured/safe operation.

As shown in FIG. 4, the first container body portion 3 may have a container body lip 8 with interior threads 9 and the second container body portion 3a may have a container body lip 12 with mating, exterior threads 13. Accordingly, the lip 12 of the second container body portion 3a may be inserted inside the lip 8 of the first container body portion 3 and the second container body portion 3a rotated in a first direction with respect to the first container body portion 3 to facilitate engagement of the threads 13, 9. The second container body portion 3a can be selectively detached from the first container body portion 3 by rotating the second container body portion 3a in a second or opposite direction. As such, the mating engagement of the first and second body portions closes and seals the container. In alternative embodiments, the second container body portion 3b may be detachably or permanently secured to the first container body portion 3a using various devices and methods including, but not limited to, TEFLON pipe joint compound, clamping, compression fitting, adhesives, fasteners and couplers.

Referring to FIGS. 2 and 4, the container 1 may also include an O-ring 11 that may form part of a barrier to isolate and/or separate the active RFID tag 22 from the atmosphere/environment in which the RFID tag container 1 is placed. The O-ring may be attached or secured to the container 1 via an O-ring seat 10 and complementary O-ring shoulder 14 provided adjacent to the threads 9, 13 on the first and second container body portions 3 and 3a. When the O-ring 11 is seated in the O-ring seat 10 and engaged by the O-ring shoulder 14, a flame-proof, fluid-tight and/or vapor-tight seal may be formed between the first and second container portions 3, 3a. This configuration may also enable the container 1 to meet various safety standards and regulations.

As shown in FIGS. 1 and 2, in some embodiments, an ID label 20 may be provided on the exterior surface of the container body 2. The ID label 20 may include a tag ID 20a which identifies the RFID tag 22 located inside the container 1 and an asset ID 20b which identifies the asset or component to which the container 1 is attached. Additional or alternative identifying information may also be included on the ID label 20.

Figure 5:
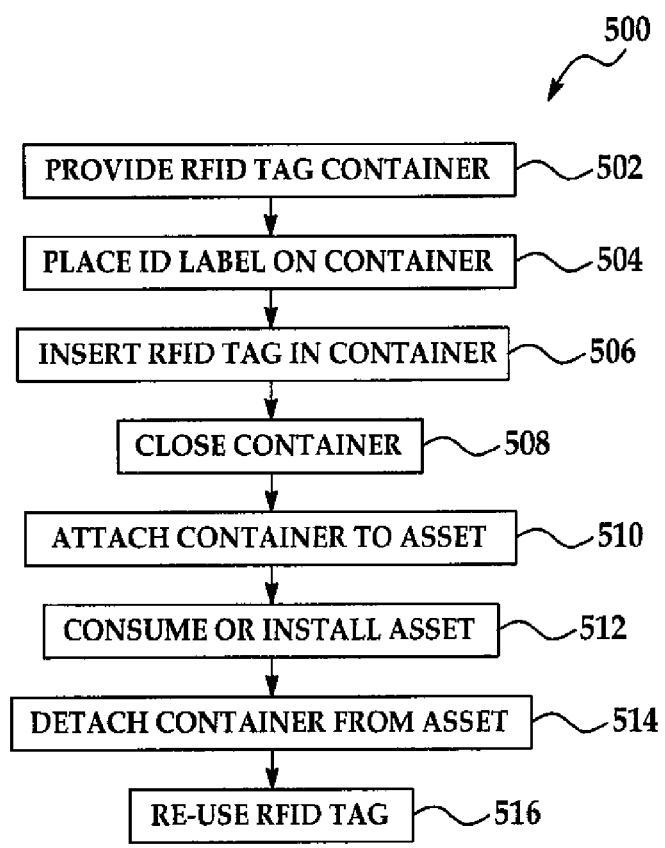
FIG. 5 is a flow diagram of an illustrative embodiment of an RFID tag containment method.

Referring next to FIG. 5, a flow diagram 500 of an illustrative embodiment of an RFID tag containment method is shown. In block 502, an RFID tag container 1 is provided. In some embodiments, the RFID tag container 1 may have complementary container portions 3, 3a which are sealingly and detachably attached to each other. In block 504, an ID label 20 may be placed on the RFID tag container. In some embodiments, the ID label 20 may include an RFID tag ID 20a and an asset ID 20b and may be attached to the exterior surface of the container body 2. Alternatively, a unique container ID that can be associated with the asset tag 20b and/or the asset itself may be used to minimize handling and configuring new reference numbers when the container 1 is moved from one asset to another. In block 506, an RFID tag may be placed in the RFID tag container. In other applications, a sensor with an energy source may be placed in the container interior 6. Depending on the application, the sensor may be a temperature sensor, a vibration sensor, a shock sensor, a GPS sensor, a GSM sensor or an electronic module, for example and without limitation. In block 508, the RFID tag container may be closed and sealed by attaching the second container portion 3a to the first container portion 3. In block 510, the RFID tag container may be attached to an asset, holding fixture, kit tray, container or cart (not shown) depending on the configuration. In block 512, the asset may be consumed or installed. The asset and the RFID tag container 1 may be associated and kept together until the asset is consumed or installed. In block 514, the RFID tag container may be detached from the asset. In block 516, the RFID tag may be decommissioned and re-used. In some applications, the RFID tag 22 and the RFID tag container 1 may be associated and commissioned permanently. Since the RFID tag container 1 contains the battery-operated RFID tag 22, there is no need to discriminate among permissible locations for the asset to which the RFID tag container 1 is attached; therefore, the RFID tag 22 is located in a compliant area since there are no restricted or non-restricted areas for the RFID tag 22. The RFID tag container 1 may be applicable beyond aircraft manufacturing to battery-operated active RFID systems in class 1 and class 2 and division 1 and 2 environments.

Figure 6:
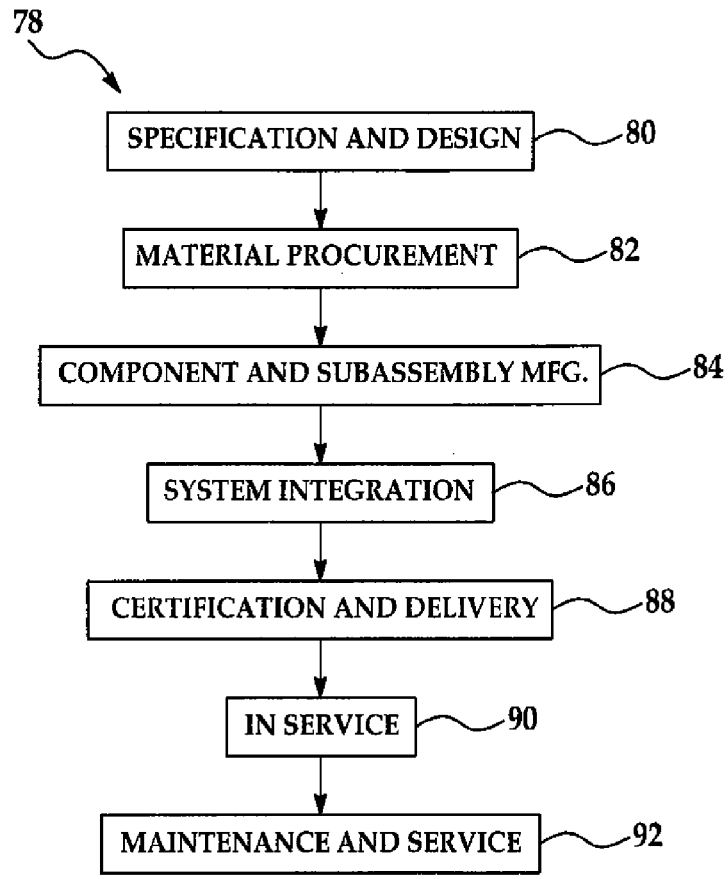
FIG. 6 is a flow diagram of an aircraft production and service methodology.
Figure 7:
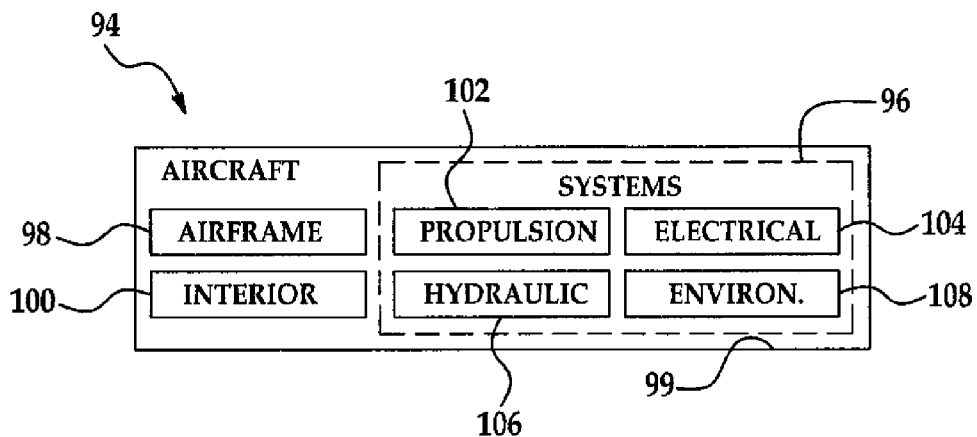
FIG. 7 is a block diagram of an aircraft.

Referring next to FIGS. 6 and 7, embodiments of the disclosure may be used in the context of an aircraft manufacturing, other relevant hazardous applications, and service method 78 as shown in FIG. 6 and an aircraft 94 having a confined space 99 as shown in FIG. 7. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 (but limited to) may be scheduled for routine maintenance and service 92 (which may also include modification, reconfiguration, refurbishment, and so on). Application could extend to delivery service centers, airport operations, and MRO facilities.

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 7, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108, airports, MRO, and supply chain facilities requiring this capability Any number of other systems may be included. Although an aerospace example is shown, the principles of the disclosure may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92. RFID tag containers 1 may be used to contain RFID tags 22 for labeling and tracking components or subassemblies at various stages of production and service.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A device adapted to house an RFID tag comprising:
   a reusable flame-proof, fluid-tight and vapor-tight sealed container and an ID label on said container, the container comprising:
      a first container portion made of hard plastic and having a first set of threads and an O-ring seat; and
      a second container portion made of hard plastic and having a second set of mating threads and an O-ring shoulder that is complementary to the O-ring seat,
      wherein the first and second container portions are sealingly and detachably attached to each other.

2. The device of claim 1 wherein said container is cylindrically shaped.

3. The device of claim 1 further comprising at least one mount flange on said container.

4. The device of claim 3 further comprising at least one opening in said at least one mount flange.

5. The device of claim 1 wherein said ID label comprises a tag ID.

6. The device of claim 1 wherein said ID label comprises an asset ID.

7. The device of claim 1 wherein said ID label comprises a unique container ID associated with an asset tag.

8. A device adapted to contain an RFID tag, comprising:
   a reusable flame-proof, fluid-tight and vapor-tight sealed container and an ID label on said container, the container comprising:
      a first container portion made of hard plastic;
      a second container portion made of hard plastic and detachably engaging said first container portion; and
      an O-ring positioned between the first container portion and the second container portion.

9. The device of claim 8 further comprising a first set of threads on said first container portion and a second set of mating threads on said second container portion.

10. The device of claim 9 further comprising a seal between said first container portion and said second container portion.

11. The device of claim 8 further comprising at least one mount flange on said container.

12. The device of claim 11 further comprising at least one opening in said at least one mount flange.

13. The device of claim 8 wherein said ID label comprises a tag ID.

14. The device of claim 8 wherein said ID label comprises an asset ID.

15. An RFID device containment method, comprising:
    inserting an RFID tag in a reusable container having a complementary container portions made of hard plastic, which are sealingly and detachably attached to each other;
    closing and sealing said container with a flame-proof, fluid-tight and vapor-tight seal;
    placing an ID label having an RFID tag ID and an asset ID on said container;
    attaching said container to an asset;
    detaching said container from said asset; and
    decommissioning said RFID tag.

16. The method of claim 15 wherein said closing and sealing comprises engaging a first container portion of said container with a mating, second container portion.

17. The method of claim 15 further comprising inserting a sensor in said container.

18. The method of claim 15 further comprising reusing said RFID tag.

19. The device of claim 1, wherein the container is configured to be compatible with IEEE 802.11 b/g (Wi-Fi), IEEE 802.15.4, or Ultra wide band 6 to 8GHz radio transmissions.

20. The device of claim 1 further comprising at least one mount flange on the first container portion and at least one mount flange on the second container portion.

21. The device of claim 3 further comprising at least one tie connected to the at least one mount flange.

22. The device of claim 8 further comprising at least one tie connected to the container.

* * * * *